(12) United States Patent
Rekdal et al.

(10) Patent No.: US 7,336,560 B2
(45) Date of Patent: Feb. 26, 2008

(54) METHOD FOR DETERMINATION OF SUFFICIENT ACQUISITION COVERAGE FOR A MARINE SEISMIC STREAMER SURVEY

(75) Inventors: Thorbjorn Rekdal, New York, NY (US); Anthony Day, Norway (NO); Christian Strand, Oslo (NO)

(73) Assignee: PGS Geophysical AS, Lysaker (NO)

( * ) Notice: Subject to any disclaimer, the term of this patent is extended or adjusted under 35 U.S.C. 154(b) by 281 days.

(21) Appl. No.: 11/139,820

(22) Filed: May 27, 2005

(65) Prior Publication Data

US 2006/0268662 A1 Nov. 30, 2006

(51) Int. Cl.
G01V 1/28 (2006.01)
G01V 1/30 (2006.01)
G01V 1/38 (2006.01)
(52) U.S. Cl. ............................................. 367/15
(58) Field of Classification Search ................. 367/15
See application file for complete search history.

(56) References Cited

U.S. PATENT DOCUMENTS

| | | | |
|---|---|---|---|
| 5,450,370 | A | 9/1995 | Beasley et al. |
| 2004/0230379 | A1 | 11/2004 | Houck |
| 2005/0060097 | A1 | 3/2005 | Parmik et al. |
| 2006/0268662 | A1* | 11/2006 | Rekdal et al. ................ 367/15 |

FOREIGN PATENT DOCUMENTS

| | | |
|---|---|---|
| GB | 2 350 428 | 11/2000 |
| GB | 2426587 A * | 11/2006 |

OTHER PUBLICATIONS

M. Brink, K. Kolbjørnsen, B. Ursin-Holm, "Evaluation of 3-D coverage specs—a case study", The Leading Edge, Apr. 1993, pp. 280-283.

Irene Huard, Simon Spitz, "Filling gaps in the coverage of 3-D marine acquisition", The Leading Edge, Nov. 1998. pp. 1606-1609.

M. Brink, N. Jones, J. Doherty, V. Vinje, R. Laurain, "Infill decisions using simulated migration amplitudes", SEG Int'l Exp. and 74th Ann. Mtg., Oct. 10-15, 2004, Expanded Abstracts, pp. 57-60, vol. 1, Denver, Colorado.

D. Muerdter, D. Ratckiff, "Understanding subsalt illumination through ray-trace modeling, Part 1: Simple 2D salt models", The Leading Edge, Jun. 2001, pp. 578-594, (Muerdter, et al. 2001a), vol. 20, Issue 6.

D. Muerdter, M. Kelly, D. Ratckiff, "Understanding subsalt illumination through ray-trace modeling, Part 2: Dipping salt bodies, salt peaks, and nonreciprocity of subsalt amplitude response", The Leading Edge, Jul. 2001, pp. 688-697, (Muerdter, et al. 2001b), vol. 20, Issue 7.

(Continued)

Primary Examiner—Dan Pihulic
(74) Attorney, Agent, or Firm—E. Eugene Thigpen; Charles R. Schweppe

(57) ABSTRACT

Seismic data sets representative of a marine seismic streamer survey are constructed with test coverage holes in the data sets. The data sets are processed and data quality degradation in the processed data due to the test coverage holes is evaluated. Maximum acceptable coverage holes for the survey are determined from the evaluation of data quality degradation.

20 Claims, 3 Drawing Sheets

OTHER PUBLICATIONS

D. Muerdter, D. Ratckiff, "Understanding subsalt illumination through ray-trace modeling, Part 3: Salt ridges and furrows, and the impact of acquisition orientation", The Leading Edge, Aug. 2001, pp. 803-816, (Muerdter, et al. 2001c), vol. 20, Issue 8.

J. Hoffman, A. Long, B. Kajl, C. Strand, "The value of subsurface coverage modeling for seismic acquisition analysis", SEG Int'l Exposition and 72$^{nd}$ Annual Meeting Oct. 6-11, 2002, Abstracts, pp. 37-40, Salt Lake Utah.

* cited by examiner

METHOD FOR DETERMINATION OF SUFFICIENT ACQUISITION COVERAGE FOR A MARINE SEISMIC STREAMER SURVEY

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine seismic surveys.

2. Description of the Related Art

In the oil and gas industry, geophysical prospecting techniques are commonly used to aid in the search for hydrocarbon deposits located in subterranean formations. In seismic surveying, seismic energy sources are used to generate a seismic signal that propagates into the earth and is at least partially reflected by subsurface seismic reflectors. Such seismic reflectors typically are interfaces between subterranean formations having different elastic properties, specifically wave velocity and rock density, which lead to differences in acoustic impedance at the interfaces. The reflections are detected by seismic receivers at or near the surface of the earth, in an overlying body of water, or at known depths in boreholes. The resulting seismic data may be processed to yield information relating to the geologic structure and properties of the subterranean formations and their potential hydrocarbon content.

The goal of seismic data processing is to extract from the data as much information as possible regarding the subterranean formations. In order for the processed seismic data to accurately represent geologic subsurface properties, the reflection amplitudes need to be represented accurately. Non-geologic effects can cause the measured seismic amplitudes to deviate from the amplitude caused by the reflection from the geologic target. Amplitude distortions resulting from irregular distribution of source and receiver positions during data acquisition is a particularly troublesome non-geologic effect. If uncorrected, these non-geologic effects can dominate the seismic image and obscure the geologic picture.

A seismic wave source generates a wave that reflects from or illuminates a portion of reflectors at different depths. The reflected seismic wave is detected by sensors and the detected signals are recorded. In a three-dimensional (3D) survey, seismic signals are generated at a large number of source locations and the survey generally illuminates large regions of the reflectors. Conventional prestack 3D migration algorithms can produce good images of the sub-surface horizons only if the surface distribution of sources and receivers is relatively uniform. In practice, there are always irregularities in the distribution of sources and receivers.

Obtaining perfectly regular acquisition geometry is typically too expensive. Consequently, prestack 3D migrated images are often contaminated with non-geologic artifacts. These artifacts can interfere with the interpretation of the seismic image and attribute maps. A goal in seismic acquisition is balancing the regularity of source and receiver distribution with reasonable acquisition cost.

In marine seismic streamer surveys, the streamers do not form straight lines. Typically marine currents cause the streamers to curve, a phenomenon called feathering and the curvature is typically measured in degrees. Changes in the currents often cause changes in the feathering. In such circumstances, if the planned sail line separation of the seismic vessel is maintained, then feathering will lead to coverage holes at some offsets or offset ranges, at some depths. The term "coverage hole" as used herein refers to a surface area where, for a given offset or offset range, there are inadequate data recorded. Data are defined to be located at the surface midpoint positions between source and receiver pairs. The coverage holes can be of several kilometers extension in the sail line (inline) direction, but are of the order of ten to a few hundred meters in the (cross line) direction orthogonal to the sail line.

In marine seismic streamer surveys, portions of the surface are often not adequately covered with receiver recordings due to cable feathering. Thus, in order to cover these areas that were missed on the first pass, additional passes of the seismic vessel through the prospect survey area have been required. Additional numbers of sail-lines can also arise from steering the vessel to achieve acceptable coverage. That means that the distance between passes in on average less than in the original acquisition plan. These additional passes significantly increase the time and associated cost to complete a survey. These additional passes of the survey vessel are referred to as "infill shooting". A large portion of marine seismic data collection can be devoted to the infill shooting portion of a survey. The infill portion may take up to several weeks or even months to complete. Thus, it is not uncommon to spend 15-20% of total acquisition costs on infill acquisition. Any reduction in these large infill costs would provide an economic advantage.

Maximum data hole sizes that will provide acceptable subsurface coverage are typically determined prior to acquisition, and are typically independent of local factors such as geology and survey objectives. Criteria for a seismic survey, such as acceptable subsurface coverage, are commonly called "infill specifications". In the past, evaluating whether a survey acquisition plan will provide acceptable subsurface coverage has been done during, or after the acquisition takes place. Waiting until after acquisition, however, means either incurring the cost of retaining equipment and personnel at the survey area until the evaluation is made or risking having to return equipment and personnel to the survey area for additional infill acquisition at considerable cost. Making infill acquisition decisions during acquisition means being able to commence additional infill acquisition without waiting. For example, Brink, M., Jones, N., Doherty, J., Vinje, V., and Laurain, R., "Infill decisions using simulated migration amplitudes", SEG Int'l. Exp. and $74^{th}$ Ann. Mtg., Denver, Colorado., Oct. 10-15, 2004, pp. 57-60 describe a method for making infill decisions during acquisition. The seismic data are modeled in a velocity depth model using navigation data and migration amplitudes along key horizons. The navigation data and velocities can be acquired during the acquisition and then the simulated migration amplitudes can be generated during the acquisition. The need for further infill shooting can then be determined.

However, it would be more efficient to determine the maximum acceptable coverage hole sizes before acquisition begins. Then, any deficiencies discovered could be corrected during acquisition, reducing considerably the need for additional infill acquisition afterwards. However, Brink et al. 2004 does not disclose how to make infill specifications relating to data hole coverage before acquisition begins.

A three-part series—Muerdter, D., and Ratckiff, D., "Understanding subsalt illumination through ray-trace modeling, Part 1: Simple 2D salt models", *The Leading Edge*, Vol. 20, Issue 6, June, 2001, pp. 578-594, (Muerdter et al. 2001a); Muerdter, D., Kelly, M., and Ratckiff, D., "Understanding subsalt illumination through ray-trace modeling, Part 2: Dipping salt bodies, salt peaks, and nonreciprocity of subsalt amplitude response", *The Leading Edge*, Vol. 20, Issue 7, July, 2001, pp. 688-697, (Muerdter et al. 2001b); and Muerdter, D., and Ratckiff, D., "Understanding subsalt illumination through ray-trace modeling, Part 3: Salt ridges and furrows, and the impact of acquisition orientation", *The Leading Edge*, Vol. 20, Issue 8, August, 2001, pp. 803-816, (Muerdter et al. 2001c)—describe the application of ray-trace modeling to clarify imaging problems under various salt structures such as salt sheets and detached irregularly-shaped salt bodies. The modeling comprises building 3D salt shape and velocity models, applying ray-tracing to 2D and 3D prestack depth migration surveys, and then sorting the data into common reflection point (CRP) gathers for comparison to the migrated seismic data. Muerdter et al. 2001c claim that modeling can be used to predict the expected illumination and determine the best acquisition parameters before acquisition, but the only parameter studied is the effect of acquisition orientation (shooting direction) relative to structural orientation (ridges and troughs) of the salt structure (although offset length is also mentioned but not discussed in Muerdter et al. 2001a). However, Muerdter et al. 2001a do not disclose how to make infill specifications relating to data hole coverage as surface coverage before acquisition begins.

Thus, a need exists for a method for a priori determination of the sufficiency of acquisition coverage for a given marine seismic streamer survey, that is, for determining the size of coverage holes that are acceptable before the acquisition takes place.

BRIEF SUMMARY OF THE INVENTION

Seismic data sets representative of a marine seismic streamer survey are constructed with test coverage holes in the data sets. The data sets are processed and data quality degradation in the processed data due to the test coverage holes is evaluated. Maximum acceptable coverage holes for the survey are determined from the evaluation of data quality degradation.

BRIEF DESCRIPTION OF THE DRAWINGS

The invention and its advantages may be more easily understood by reference to the following detailed description and the attached drawings, in which.

Figure 1A:
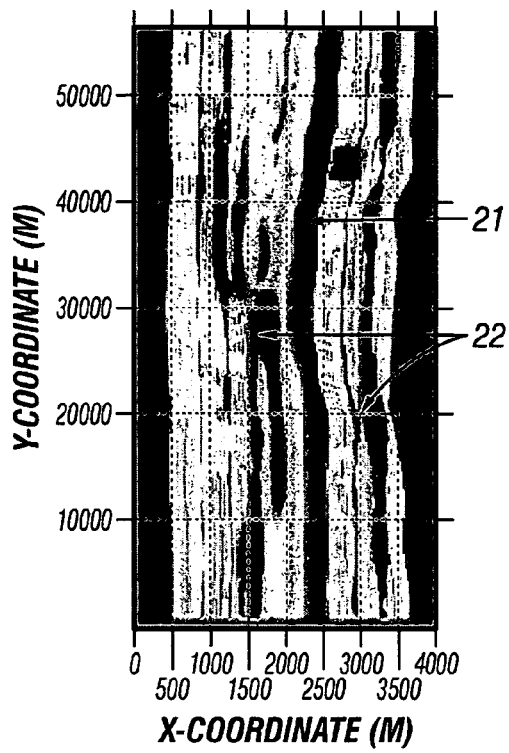
FIGS. 1A-1D are examples of coverage holes in marine seismic streamer data at four offset ranges.
Figure 1B:
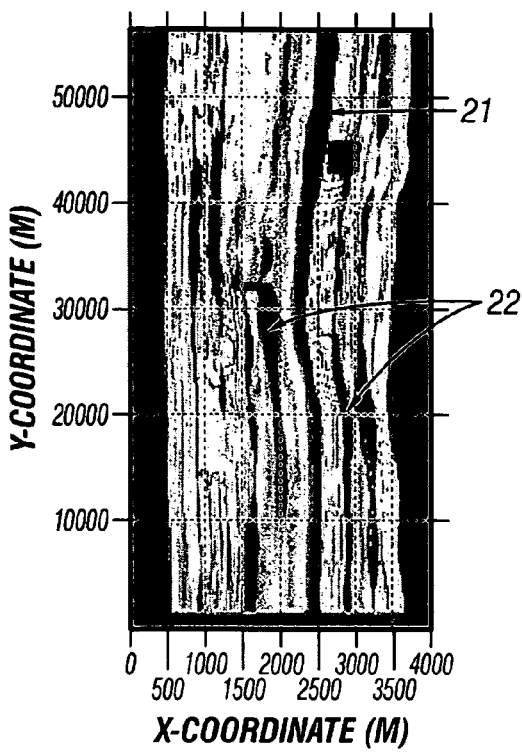
Figure 1C:
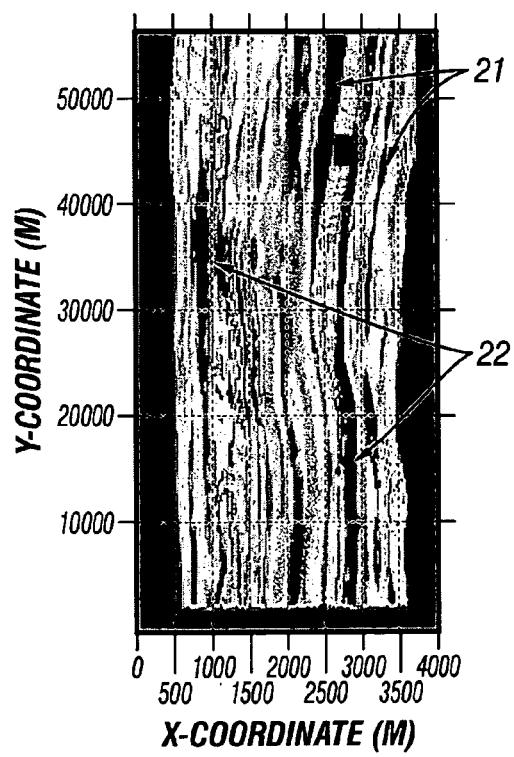
Figure 1D:
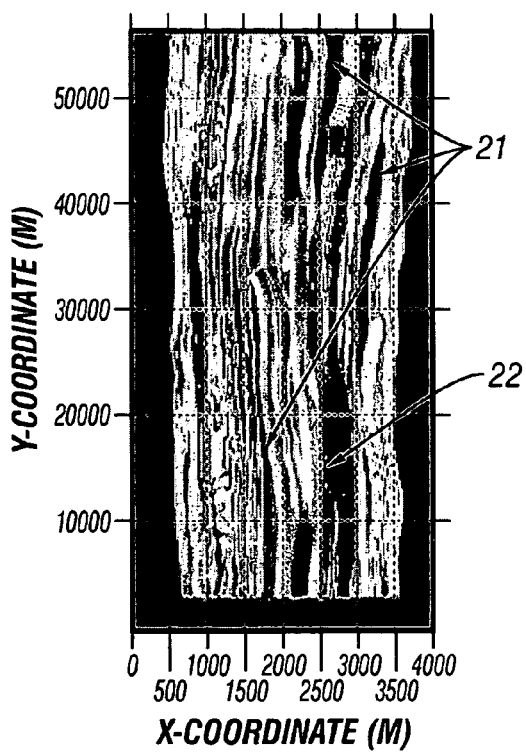

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for a priori determination of sufficient acquisition coverage for a marine seismic streamer survey. The determination is based upon evaluating the impact of coverage holes in the acquired data at different offsets and depths in the processed seismic data.

FIGS. 1A-1D show examples of coverage holes in marine seismic streamer data in four offset ranges at a selected depth. FIGS. 1A-1D cover the offset ranges 165-1665 meters, 1665-3165 meters, 3165-4665 meters, and 4665-6165 meters, respectively. The coverage holes are the dark grey areas 21, and are typical for marine seismic streamer data. The coverage holes 21 are typically elongated in the sail line direction and thinner in the cross line direction. The width of the coverage holes 21 varies with offset, as shown in FIGS. 1A-1D. The areas of high coverage are the light grey areas 22, and are similarly elongated in the sail line direction and of varying width. The coverage holes 21 and their elongated shape are due to occurrences during marine streamer surveys such as feathering or avoidance of obstacles.

In performing an embodiment of the invention, a range of sizes for test coverage holes, test offsets, and test depths are selected. Full coverage seismic data sets are constructed to be representative of the geology of the survey area and proposed survey vessel configuration. From these full coverage data sets, partial coverage seismic data sets with test coverage holes are constructed. The partial coverage seismic data sets are constructed by removing data to model test coverage holes spanning the size range of coverage holes anticipated in the proposed survey. These full and partial coverage seismic data sets may be constructed from real data (if available), synthetic data, or a combination of real and synthetic data. Then the seismic data sets are processed through standard data processing, such as pre-stack migration.

The data quality degradation due to the selected test coverage holes is evaluated in the processed data sets for the test offsets and the test depths. The data quality degradation in the processed seismic data due to the test coverage holes is evaluated by comparing the data quality in the partial coverage sets with the data quality in a full coverage set. The data quality degradation is typically evaluated by determining the extent of data artifacts in the processed data. The estimated data quality degradation for different sizes of test coverage holes is used to determine maximum acceptable coverage holes as a function of offset and depth that will satisfy the data quality requirements for the survey. This determination of maximum acceptable coverage holes can then be used to maximize the efficiency of the survey acquisition.

Figure 2:
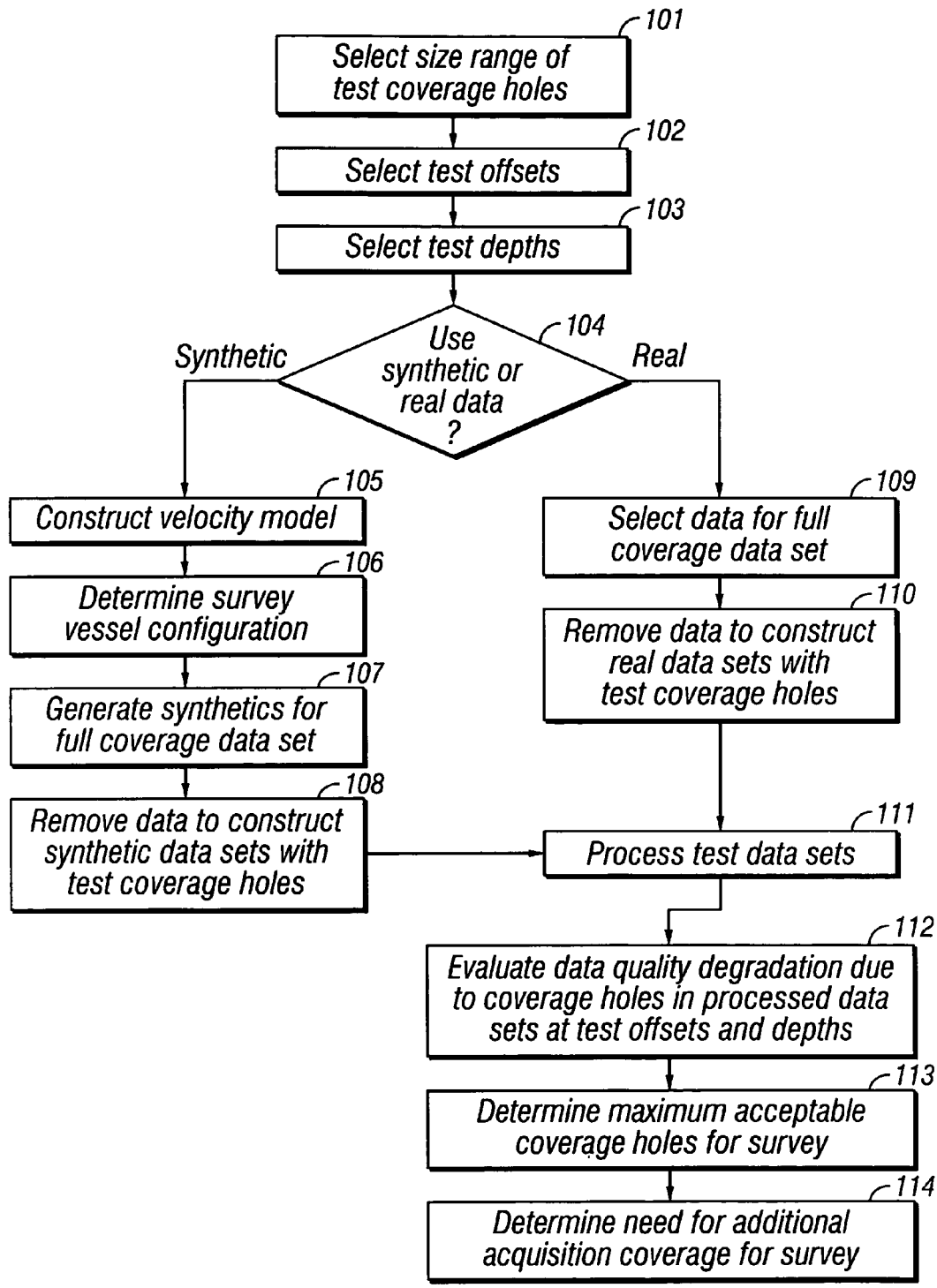
FIG. 2 is a flowchart illustrating the processing steps of an embodiment of the method of the invention for determining adequacy of acquisition coverage for a marine seismic survey in a survey area.

FIG. 2 shows a flowchart illustrating the processing steps of an embodiment of the method of the invention for determining sufficiency of acquisition coverage for a marine seismic streamer survey. First, at step 101, a size range is selected for test coverage holes. The size range is selected to cover the sizes of coverage holes that would be anticipated during a proposed marine seismic streamer survey. The test coverage holes will be generated within test data sets to test subsurface coverage for the proposed survey. The size range of the test coverage holes may be the size range that it is anticipated may occur as a result of feathering of the marine seismic streamers, deviation of the sail line to avoid anticipated obstacles in the survey area, equipment malfunctions in streamers or parts of streamers, or to any other known source of coverage holes as is well known in the art of geophysical prospecting.

At step 102, test offsets are selected. The test offsets are selected to cover the range of offsets that would be anticipated to occur during the proposed marine seismic streamer survey. In an alternative embodiment, test offset ranges is selected for testing the test data sets. In quality specifications for marine seismic data acquisition, contributions at different offsets are often grouped by binning the offsets into offset ranges, as is well know in the art of seismic acquisition. The method of the invention will be illustrated by referring to a set of test offsets rather than test offset ranges for convenience only, but this is not intended to be a restriction of the invention.

At step 103, test depths are selected. The test depths are selected to cover the range of depths that would be of interest during the proposed marine seismic streamer survey. In an alternative embodiment, travel times are selected for testing subsurface coverage, rather than depths. Travel times are an equivalent method for measuring depth, as is well know in the art of seismic data processing.

At step 104, it is determined if real data sets or synthetic data sets are to be used for testing subsurface coverage of the proposed seismic survey. In one embodiment, the seismic data sets comprise real seismic data selected from the survey area or other similar areas that are representative of the geology of the survey area. In yet another embodiment, the seismic data sets comprise synthetic seismic data selected to be representative of the geology of the survey area. In yet another embodiment, the seismic data sets comprise a combination of both real and synthetic seismic data selected to be representative of the geology of the survey area.

Full coverage seismic data sets are selected (or constructed), and from the full coverage data sets, partial coverage data sets are constructed. The partial coverage seismic data sets will be constructed to simulate the effects of test coverage holes within the size range selected in step 101. The seismic data sets are preferably selected from the available seismic data that best represent the geology, as well as the survey geometry configuration, anticipated in the survey. If synthetic data are to be used, then the process continues to step 105 to construct the synthetic data sets. If real data are to be used, then the process proceeds to step 109 to construct the real data sets. If a combination of both synthetic and real data is to be used, then the process proceeds to both steps 105 and 109.

At step 105, a velocity model is constructed for the area to be surveyed in the proposed marine seismic streamer survey. The velocity model will be used to generate the synthetic data sets. In one embodiment, a single velocity model is selected to represent the known velocity in the survey area. In an alternative embodiment, a set of velocity models is selected to represent the known velocity of the survey area. The velocity model or models are selected from whatever velocity information is available, to best represent the velocity of the survey area. If velocity models are not already available for the survey area, then appropriate velocity models for the survey area are developed. The velocity models used may be constructed with dips representative of the geology of the survey area, at least as measured in the inline and cross-line dips of known horizons. The method of the invention will be illustrated by referring to a single velocity model for convenience only, but this reference is not intended to be a restriction of the invention.

At step 106, survey vessel configuration is defined for the proposed marine seismic streamer survey. The survey vessel configuration will be used to generate the synthetic data sets. The survey vessel configuration determines the geometry of the sources and receiver locations in the survey. Typical important parameters for the survey vessel configuration include, but are not limited to, number of streamers, length of the streamers, separation of the streamers, number of source arrays, and separation between the source arrays and the streamers.

At step 107, synthetic seismic data traces are generated for a full coverage data set. The synthetic seismic data traces are generated using the velocity model from step 105 and the survey vessel configuration from step 106. Typical important variations in the modeling of the synthetic seismic data sets include, but are not limited to, target depth, frequency content, offset range, and cross-line and inline dips of horizons. The fact that far-offset data are only useful from a given depth is also taken into account. After construction of the full coverage synthetic data set (without coverage holes) further processing is performed at step 111.

At step 108, synthetic seismic data sets with test coverage holes are constructed from the full coverage synthetic data set from step 107. Test coverage holes can be modeled by removing data from the full coverage data set. The data removed can be some or all of the seismic traces in the full coverage data set. After construction of the partial coverage synthetic data sets, further processing of the partial coverage data sets is performed at step 111. After processing, the partial coverage data sets with test coverage holes will be compared to the full coverage data set without coverage holes.

At step 109, available real seismic data are selected to form a full coverage data set. In one embodiment, the seismic data comprise real seismic data selected from the survey area that are representative of the geology of the survey area. In another embodiment, the seismic data comprise real seismic data selected from another area or areas similar enough to the survey area to be representative of the geology of the survey area. In another embodiment, the seismic data comprise a combination of real seismic data selected from the survey area and from other similar areas. After construction, the full coverage real data set (without coverage holes) is processed further at step 111.

At step 110, real seismic data sets with test coverage holes are constructed from the full coverage data set from step 109. Test coverage holes can be simulated by removing data from the full coverage data set. The data removed can be some or all of the seismic traces in the full coverage data set. For example, the data removed could simulate missing data due to feathering of the marine seismic streamers, anticipated obstacles in the survey area, equipment malfunctions in streamers or parts of streamers, or to any other known source of coverage holes. Different sizes of coverage holes, to cover the size range selected for testing in step 101, can be simulated by the amount of data that is removed. After construction, the partial coverage real data sets are processed further at step 111. The partial coverage data sets with test coverage holes will be compared after processing to the full coverage data set without coverage holes.

At step 111, the seismic data sets are processed. These seismic data sets include any synthetic or real data sets and any full or partial coverage data sets which were selected or constructed as described above. Typically, the processing will comprise pre-stack migration. However, this particular form of processing is not intended to be a restriction of the invention. For example, the processing may include, but is not restricted to, partial migration (DMO), post stack migration, inversion, interpolation, and extrapolation.

At step 112, the effect of the test coverage holes on data quality in the processed data sets from step 111 is evaluated. The data quality degradation due to the effects of the test coverage holes is evaluated at the test offsets (or offset ranges) selected in step 102 and the test depths selected in step 103. The data quality degradation can be evaluated by comparing the data quality in the processed partial coverage data sets to the data quality in the processed full coverage data sets. The data quality degradation in the processed seismic data sets is typically estimated by observing the levels of artifacts caused by the test coverage holes. Typical artifacts include, but are not limited to, event time shifts, event amplitude decays, phase distortion, and increases in migration noise as represented, for example, by migration smiles.

In another embodiment, the data removed from a full coverage data set to model a test coverage hole in the full coverage data set may be processed and the processed removed data compared to the processed full coverage data set to evaluate the data degradation resulting from the coverage hole.

The effect of the test coverage holes on data quality is dependent upon the bandwidth (frequency content) of the signals in the processed data. The frequency content typically depends upon depth and offset. The expected frequency content of the data to be acquired will typically be taken into account when the effect of data quality degradation is evaluated in the partial coverage data sets with coverage holes, after the processing done in step 111.

Figure 3:
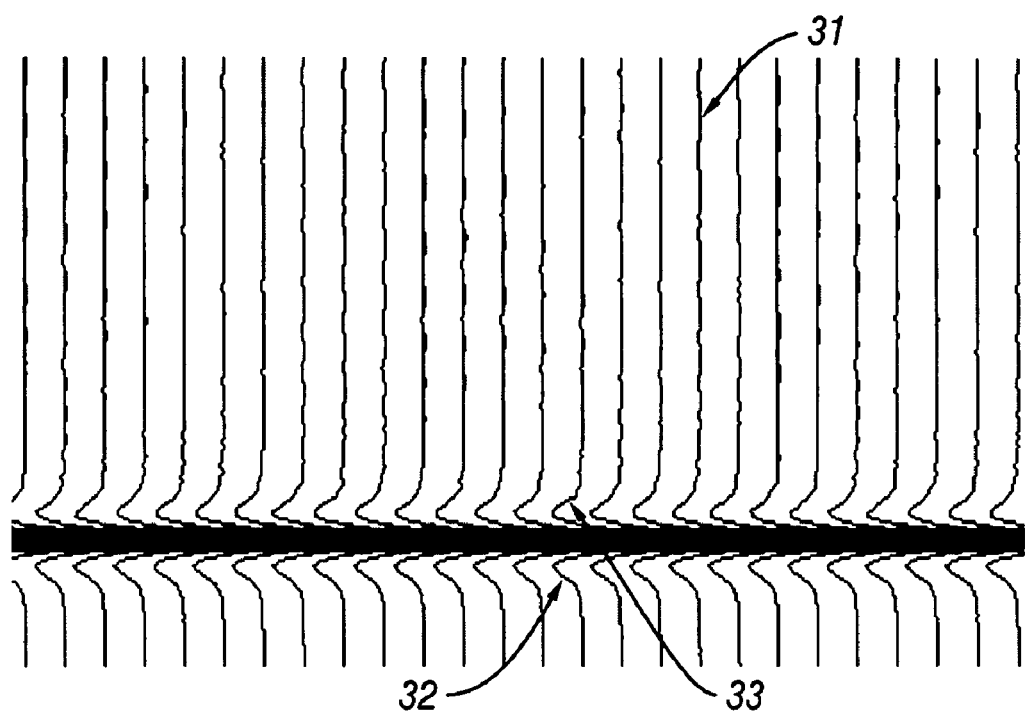
FIG. 3 is a synthetic crossline section with no coverage holes, after prestack migration.
Figure 4:
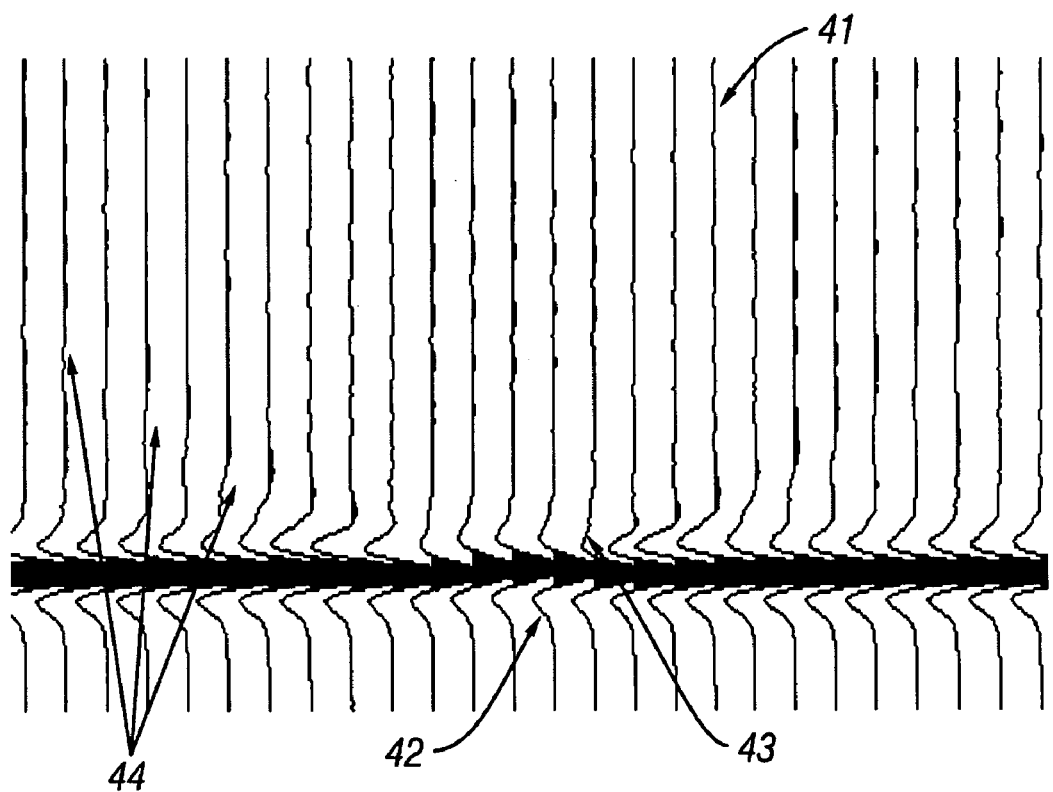
FIG. 4 is the crossline section of FIG. 3 with a 75 meter coverage hole, after prestack migration.

FIGS. 3 and 4 show examples of artifacts in processed seismic data. These artifacts are typical indications of data quality degradation due to the effects of the test coverage holes. FIG. 3 shows a crossline section 31 of synthetic data after prestack time migration. FIG. 4 shows the same crossline section 41 showing the effect of a coverage hole, again after prestack time migration. A 75 meter coverage hole is simulated to be extending beyond the migration aperture in the inline direction. A 2.5 msec. time shift is shown at position 42 in FIG. 4, as compared to corresponding position 32 in FIG. 3. Smaller seismic amplitude is visible at position 43 in FIG. 4, as compared to corresponding position 33 in FIG. 3. An example of a migration smile, not present in FIG. 3, is visible at position 44 in FIG. 4.

At step 113, maximum acceptable sizes of coverage holes are determined for the proposed marine seismic streamer survey. The maximum acceptable sizes are determined by analysis of the evaluations made in step 112 of the data quality degradation due to the effects of the test coverage holes. The maximum acceptable sizes of coverage holes typically depend upon the survey objectives and the geology of the survey area. Thus, the maximum acceptable sizes determined here may then be expressed as infill specifications for the proposed survey. For example, these infill specifications may express the maximum acceptable sizes of coverage holes as a function of offsets and depths.

The maximum acceptable sizes of coverage holes will also vary with the required degree of coverage. Full coverage means that the coverage is as planned for the particular survey vessel configuration, with no coverage holes. Zero coverage means no data in a specified size or area. Degree of coverage, usually represented as a percentage of coverage, corresponds to the fraction of coverage between zero and full coverage.

At step 114, it is determined if improved acquisition coverage is needed during the proposed marine seismic streamer survey. If additional coverage is needed, then coverage may be improved, for example, by reducing the separation between sail lines of the seismic vessel towing the seismic streamers. Alternatively, additional infill lines may be planned for. The invention is not intended to be limited by these examples, however, and would include other conventional means for improving coverage as are well known in the art of geophysical prospecting.

Thus, the method of the invention enables the a priori determination of infill specifications for a proposed marine seismic streamer survey. By comparing the data quality degradation due to test coverage holes in full coverage and partial coverage seismic data sets, maximum acceptable coverage holes can be determined for the survey before acquisition begins. Corrections to the infill specifications, if necessary, can be made before the survey is performed, thus reducing or avoiding the high cost of infill shooting after acquisition.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for determination of sufficient acquisition coverage for a marine seismic streamer survey, comprising:
   constructing full coverage seismic data sets representative of the survey;
   constructing partial coverage seismic data sets with test coverage holes, the holes having a plurality of sizes;
   processing the full coverage and partial coverage seismic data sets;
   estimating data quality degradation due to the test coverage holes in the processed seismic data sets at test offsets and test depths; and
   determining maximum acceptable coverage holes for the survey from the estimated data quality degradation.

2. The method of claim 1, further comprising the initial steps of:
   selecting a size range for the test coverage holes for the survey;
   selecting the test offsets for the survey; and
   selecting the test depths for the survey.

3. The method of claim 1, wherein the test offsets comprises test offset ranges.

4. The method of claim 2, wherein the steps of selecting depend upon survey objectives and geology in the survey.

5. The method of claim 1, wherein the seismic data sets comprise synthetic seismic data sets.

6. The method of claim 1, wherein the seismic data sets comprise real seismic data sets.

7. The method of claim 1, wherein the seismic data sets comprise a combination of synthetic and real seismic data sets.

8. The method of claim 5, wherein the step of constructing a full coverage seismic data set comprises:

constructing a velocity model for the survey area;
determining a survey vessel configuration for the survey; and
generating synthetics from the velocity model and survey vessel configuration to construct a full coverage seismic data set.

9. The method of claim 8, wherein the velocity model comprises a set of velocity models.

10. The method of claim 8, wherein the step of constructing partial coverage seismic data sets comprises:
removing data from the full coverage data set to model test coverage holes spanning the selected size range.

11. The method of claim 5, wherein the step of constructing a full coverage seismic data set comprises:
selecting available real data to construct a full coverage seismic data set.

12. The method of claim 11, wherein the step of constructing partial coverage seismic data sets comprises:
removing data from the full coverage data set to model test coverage holes spanning the selected size range.

13. The method of claim 1, wherein the step of processing the seismic data sets comprises pre-stack migration.

14. The method of claim 1, wherein the step of estimating the data quality degradation due to the test coverage holes comprises:
comparing the data quality in the processed partial coverage seismic data sets to the data quality in the processed full coverage seismic data sets.

15. The method of claim 10, wherein the step of comparing the data quality in the processed seismic data sets comprises:

processing the data removed from the full coverage data set to model a test coverage hole; and
comparing the data quality in the processed removed data to the data quality in the processed full coverage seismic data set.

16. The method of claim 12, wherein the step of comparing the data quality in the processed seismic data sets comprises:
processing the data removed from the full coverage data set to model a test coverage hole; and
comparing the data quality in the processed removed data to the data quality in the processed full coverage seismic data set.

17. The method of claim 14, wherein the step of comparing the data quality in the processed seismic data sets comprises:
measuring artifacts in the processed seismic data sets caused by the test coverage holes.

18. The method of claim 17, wherein the artifacts measured are taken from a set including amplitude decay, time shifts, phase distortion, and noise-induced migration smiles.

19. The method of claim 17, wherein the artifacts measured are based on expected frequency content of the processed seismic data sets.

20. The method of claim 1, further comprising: determining infill specifications from the determined maximum acceptable coverage holes.

* * * * *